(12) United States Patent
Rohner et al.

(10) Patent No.: US 11,051,922 B2
(45) Date of Patent: Jul. 6, 2021

(54) DENTAL RESTORATION PRODUCTION DEVICE AND ADD-ON OR ATTACHMENT

(71) Applicant: Ivoclar Vivadent AG, Schaan (LI)

(72) Inventors: Gottfried Rohner, Altstätten (CH); Markus Pauler, Feldkirch (AT); Alexander Kögel, Munich (DE)

(73) Assignee: Ivoclar Vivadent AG, Schaan (LI)

( * ) Notice: Subject to any disclaimer, the term of this patent is extended or adjusted under 35 U.S.C. 154(b) by 240 days.

(21) Appl. No.: 16/306,695

(22) PCT Filed: May 24, 2017

(86) PCT No.: PCT/EP2017/062559
§ 371 (c)(1),
(2) Date: Dec. 3, 2018

(87) PCT Pub. No.: WO2017/211588
PCT Pub. Date: Dec. 14, 2017

(65) Prior Publication Data
US 2019/0117358 A1  Apr. 25, 2019

(30) Foreign Application Priority Data
Jun. 8, 2016  (EP) .................................... 16173538

(51) Int. Cl.
*A61C 19/00* (2006.01)
*A61C 13/15* (2006.01)
(Continued)

(52) U.S. Cl.
CPC .............. *A61C 19/004* (2013.01); *A61C 3/00* (2013.01); *A61C 5/77* (2017.02); *A61C 5/85* (2017.02); *A61C 13/0001* (2013.01)

(58) Field of Classification Search
CPC ........... A61C 19/004; A61C 3/00; A61C 5/77; A61C 5/85; A61C 13/0001
(Continued)

(56) References Cited

U.S. PATENT DOCUMENTS 4,666,405 A * 5/1987 Ericson ................ A61C 19/004
433/215
5,030,093 A * 7/1991 Mitnick ............... A61C 19/004
433/164
(Continued)

FOREIGN PATENT DOCUMENTS

DE         10234994 A1    2/2004

*Primary Examiner* — Matthew M Nelson
(74) *Attorney, Agent, or Firm* — Ann M. Knab; Thad McMurray (57) ABSTRACT

The invention relates to a dental restoration production device, comprising a curable dental restoration material (20) and a radiation-curing device by means of which the curable dental restoration material (20) can be cured using light radiation, UV radiation and/or heat radiation in order to produce a dental restoration part (22), and comprising an add-on (24) or attachment to the radiation-curing device, which faces said dental restoration material (20) or can be directed thereto, wherein said attachment or add-on (24) has a molding surface that corresponds to the target shape of the surface (52) of the dental restoration material (20) and forms a negative mold (54) therefor on the region facing the radiation-curing device.

16 Claims, 4 Drawing Sheets

(51) Int. Cl.
*A61C 3/00* (2006.01)
*A61C 5/77* (2017.01)
*A61C 5/85* (2017.01)
*A61C 13/107* (2006.01)

(58) Field of Classification Search
USPC .......................................................... 433/164
See application file for complete search history.

(56) References Cited

U.S. PATENT DOCUMENTS

| | | | |
|---|---|---|---|
| 2004/0214130 A1* | 10/2004 | Fischer | A61C 19/004 |
| | | | 433/29 |
| 2006/0115792 A1* | 6/2006 | Vuillemot | A61K 6/887 |
| | | | 433/215 |
| 2013/0130202 A1* | 5/2013 | Vuillemot | A61C 13/0004 |
| | | | 433/213 |
| 2014/0131393 A1* | 5/2014 | Sirkis | A61C 5/62 |
| | | | 222/386 |
| 2017/0312058 A1* | 11/2017 | Fisker | A61C 13/20 |

\* cited by examiner

DENTAL RESTORATION PRODUCTION DEVICE AND ADD-ON OR ATTACHMENT

CROSS-REFERENCE TO RELATED APPLICATIONS

This application is a National Stage application of International patent application PCT/EP2017/062559 filed on May 24, 2017, which claims priority to European patent application No. 16173538.6 filed on Jun. 8, 2016, the disclosures of which are incorporated herein by reference in their entirety.

FIELD OF THE INVENTION

The invention relates to a dental restoration production device and to an add-on or attachment for the dental restoration production device.

BACKGROUND OF THE INVENTION

When light-curable dental restoration materials are cured by light, it is important that, if possible, the entire radiation produced by the light-curing device and exiting from the light-guide rod is supplied to the dental restoration material. During light curing, the end of the light-guide rod is guided into the mouth of the patient to be able to effect light curing exactly at that position at which the dental restoration material is present. In case of accidental contact, the tip, that is to say the light output surface, of the light-guide rod may become contaminated resulting in a degradation of the light output and possibly to an incompletely cured and thus unusable dental restoration part.

A protective cover for a light-curing device has become known from DE 42 33 870 A1 which is to protect the end of the light-guide rod against contamination.

This protective cover is configured as a disposable product and is to be discarded after use.

However, experience has shown that dentists tend to work economically, and in a predominant number of cases a disposable product of this type is not discarded contrary to application instructions but used again to avoid new procurement.

At best, the dentist cleans the protective cover before using it a second time, wherein it is not ensured, however, that this has been done and that the cleansing is perfect.

Typically, the end of the light-guide rod is made of glass and thus considerably harder than the still soft dental restoration material. When the light-guide rod is accidentally pressed against the still soft dental restoration material, it deforms it accidentally such that the desired tooth surface in the region of the occlusal surface—or possibly also in the distal region thereof, from which direction the end of the light-guide rod is led to the dental restoration material—does not at all have the desired design anymore which is adapted exactly to the antagonist of the tooth to be treated.

In order to avoid accidental deformation of this type, it has also been known for long, for instance from US 2004/0214130 A1, to use a flexible protective cover, for instance made of polyurethane or silicone, which is said not to deform the still soft dental restoration material harmfully even in case of contact.

However, it is difficult to set the hardness of the silicone or polyurethane to be so small that no deformation occurs, the more so as the uncured dental restoration material may possibly also be very soft. A durometer hardness from 40 is provided according to the mentioned publication. But also in case of such a durometer hardness there is the possibility that the hardness of the still soft dental restoration material is smaller such that not the soft add-on part but the dental restoration material is deformed resulting in the mentioned adverse effects.

Particularly in case of the realization with polyurethane, there is also the possibility that the semi-liquid dental restoration material gets caught on the cover because of contact between the soft dental restoration material and the flexible cover and that it is also removed partially during removal such that less dental restoration material is available for the light-curing process than intended.

This also leads to an insufficient realization of the desired dental restoration part.

SUMMARY OF THE INVENTION

In contrast, it is the task of the invention to provide a dental restoration production device or an add-on or attachment according to the claims which prevent the still soft dental restoration material from being affected undesirably by approximation of the light-curing device.

This task is inventively solved by claims 1 and 17, respectively. Advantageous developments may be taken from the subclaims.

According to the invention, it is made use of the fact that dental restoration parts are typically realized in a computer-aided manner, that is to say by CAD/CAM. In this respect, the design phase takes place after the intra-oral scan in the virtual space on the computer, and after determination of the outer shape of the dental restoration part the user may basically decide how to produce the dental restoration part. For instance, the CAD data allow for conversion into milling data in the STL format or also the realization of a positive model. It is then cast and after curing of the muffle removed therefrom. In this way, a mold cavity is produced to provide a dental restoration part made of ceramics or composite material.

When determining the shape of the dental restoration part the shape of the antagonist is also considered as a matter of course but gnathological aspects may also be involved by taking so-called functional impressions.

According to the invention, the data available anyway is now used surprisingly easily for the production of a light-curing device add-on or attachment made of transparent material. This add-on or attachment inventively forms a negative mold for the dental restoration material.

Thus, at the same time the add-on or attachment forms a stamp for determining the shape of the dental restoration part which is used while the dental restoration material is still soft.

While up to now contact between the light-curing device and the dental restoration material has been avoided if possible, now contact is sought and made use of.

In contrast to the state of the art, the opposite way is chosen in this respect as the dental restoration material is always softer than the add-on or attachment before curing. Surprisingly, the problems existing in the state of the art in case of similar softness do not occur.

In an advantageous configuration, the add-on or attachment is made of silicone or any desired other transparent material which does not adhere to the dental restoration material.

According to the invention, the light-guide rod is held such that it is in contact with the dental restoration part during the entire light-curing time which may amount to, for instance, between 5 and 30 seconds. During this time, the dental restoration material cures from an almost liquid aggregate state to a very solid aggregate state.

Surprisingly, the invention offers another particular advantage with respect to the light-curing time. Due to direct contact between the surface of the dental restoration material and the add-on or attachment it is not required to send the radiation used for the curing process and coming from the light-guide rod through an air path. The radiation is led directly from the end of the light-guide rod into the add-on or attachment and from there into the dental restoration material. Now, the index of refraction of the add-on or attachment may be chosen preferably such that it is between that of the glass of the light-guide rod and that of the dental restoration material in the soft state. Thus, the share of the radiation reduced at the transition surfaces may be reduced considerably, for instance by one power of ten, as it is prevented in this respect that an optical transition between materials with high and low indexes of refraction has to be produced twice, with the typical losses due to the reflection or refraction at the transition surface.

However, this means that curing times may be considerably shorter while the input light power remains the same.

It is to be understood that these aspects hold true not only for light curing but also for thermal curing, while a certain share of the transmitted radiation is in the infrared range anyway in most cases and thus to be considered thermal radiation.

The inventive add-on or attachment made of the suitable material, such as silicone, may be produced in an advantageous configuration, for instance, by 3D printing or by milling or by casting. Then, the silicone add-on forms the negative mold for the desired tooth contour. In a way known per se, it may be derived from the contour detected by means of an interdental scanner and is available as a negative mold for the surface of the tooth after application of the dental restoration part.

In this configuration, the add-on or attachment is a disposable product but one which is patient-specific such that re-use is excluded.

According to the invention, polishing is no longer required due to the smooth surface of the add-on or attachment, or is simplified in any case.

In a further embodiment, it is provided to realize the add-on or attachment with a negative basic mold for modeling composites. The basic mold is recreated in accordance with human teeth and it is possible to model the patient-specific mold at little expense thereat wherein the desired shape of the dental restoration part may be cured then in one go.

A further option for producing the surface of the add-on or attachment involves the antagonist. In this solution, the add-on or attachment which has not cured completely yet is held to the antagonist initially. The light-curing device is turned on and thus the add-on or attachment is cured at least partially then. The negative surface for the dental restoration material produced in this way is then used as a negative mold for the dental restoration material—possibly after certain processing—such that a matching occlusal surface is produced automatically for the tooth to be treated.

A further possibility is to keep ready a library of negative molds for nature-identical negative molds of all natural teeth so to speak. Then, there are corresponding negative molds for every tooth in the corresponding basic shape but also in different sizes. In this way, a negative mold tooth form key may be provided for the entire human set of teeth.

It is also possible to insert the dental restoration material into the mold cavity which is formed between the residual tooth and the add-on or attachment. For this purpose, the add-on or attachment comprises an inlet channel for dental restoration material which is then inserted, for instance by means of a syringe. In this solution, it is favorable if attention is given to the fact that the air present in the mold cavity may escape then. This takes place preferably via a porous air outlet which enables that air escapes but prevents passage of dental restoration material. This solution ensures that no excess dental restoration material is present such that there is no laborious removal of edge beads as is usual with composite materials.

It is to be understood that both the inlet channel and the air outlet should not be positioned in the radiation range. They may both be arranged laterally, for instance, preferably opposite each other. The inlet channel may also be produced by simple lateral penetration of the add-on or attachment using a syringe with the dental restoration material. The mold cavity is then filled using the syringe until counter-pressure is produced which indicates that the mold cavity is filled completely with dental restoration material.

Preferably, the air outlet is arranged in an upper region of the mold cavity to ensure in any case that not air bubbles remain which would then require refilling.

By clever arrangement of the air outlet the remaining air in the mold cavity may escape completely in any case.

In any case, the add-on or attachment is attached to the front end of the light-guide rod of the light-curing device securely and undetachably. In order to avoid disruption of the light ray by an intermediate layer of air it is possible to moisten the surface of the light-guide rod prior to application of the add-on or attachment with a suitable liquid such that an air-free transition of radiation between the exit end of the light-guide rod and the add-on or attachment is ensured.

The add-on or attachment may basically comprise any desired shape. Preferably, it surrounds the front end of the light-guide rod completely and then extends to the negative mold surface of the add-on or attachment—possibly in a slightly tapering or widening fashion—wherein this surface completely covers the region of dental material to be applied in any case.

Preferably, the overlap margin to the healthy tooth is chosen such that a minimum width is not undercut which should amount to at least 1 mm, but preferably to 2 mm or 3 mm. In this way, pressure may be applied between the light-curing device and the tooth without deforming the add-on or attachment. At the same time, this pressure serves as a support to ensure that the dentist faces no difficulties to hold the light-curing device steady during the treatment, at least in the curing time which is even shorter now.

It is also favorable if the add-on or attachment is produced from a highly transparent material. For this purpose, the applied radiation energy is not reduced or not significantly reduced. Additionally, the add-on or attachment may be configured basically as a massive body which is especially stable in its center region and only whose ends are expanded in a sleeve-like manner to surround the ends of the light-guide rod on the one hand and for support on the healthy regions of the tooth to be treated on the other hand.

According to an advantageous configuration an additionally enclosed and reusable adapter ring is provided. The adapter ring makes sense when the type of the light-curing device to be used is not known right from the start. If, for instance, light-curing devices with a light-guide rod diameter of 8 mm, 10 mm or 12 mm may be used, the seat opening for the front end of the light-guide rod which is configured like a blind hole may be produced preferably to have the largest diameter to be expected, that is to say 12 mm in this case. When a light-curing device with a light-guide rod of 10 mm is used, an adapter ring having a wall thickness of 1 mm is used which fills the otherwise existing ring gap between the seat opening of the add-on or attachment and the front end of the light-guide rod. When a light-curing device with a light-guide rod diameter of 8 mm is used, an adapter ring having a wall thickness of 2 mm is used accordingly.

This process is particularly favorable if the add-on or attachment is produced in a central dental laboratory and then made available to the dentist. Then, the dental laboratory must not receive additional information indicating which diameter of the light-guide rod is going to be used.

If, however, a 3D print is made on site, that is to say in the dental practice, which is usually referred to as chairside solution, the dentist knows in most cases which light-curing device is going to be used such that the adapter ring is not required.

In an advantageous configuration it is provided that the seat opening for the front end of the light-guide rod has a certain undersize compared to the outer diameter of the light-guide rod.

The light-guide rod may still be inserted into the seat opening via a possibly available lead-in chamfer as the material of the add-on or attachment is typically slightly elastic and rests on the light-guide rod without play when an undersize is realized.

BRIEF DESCRIPTION OF THE DRAWINGS

Further advantages, details and features may be taken from the following description of several exemplary embodiments of the invention in conjunction with the drawings.

DETAILED DESCRIPTION

Figure 1:
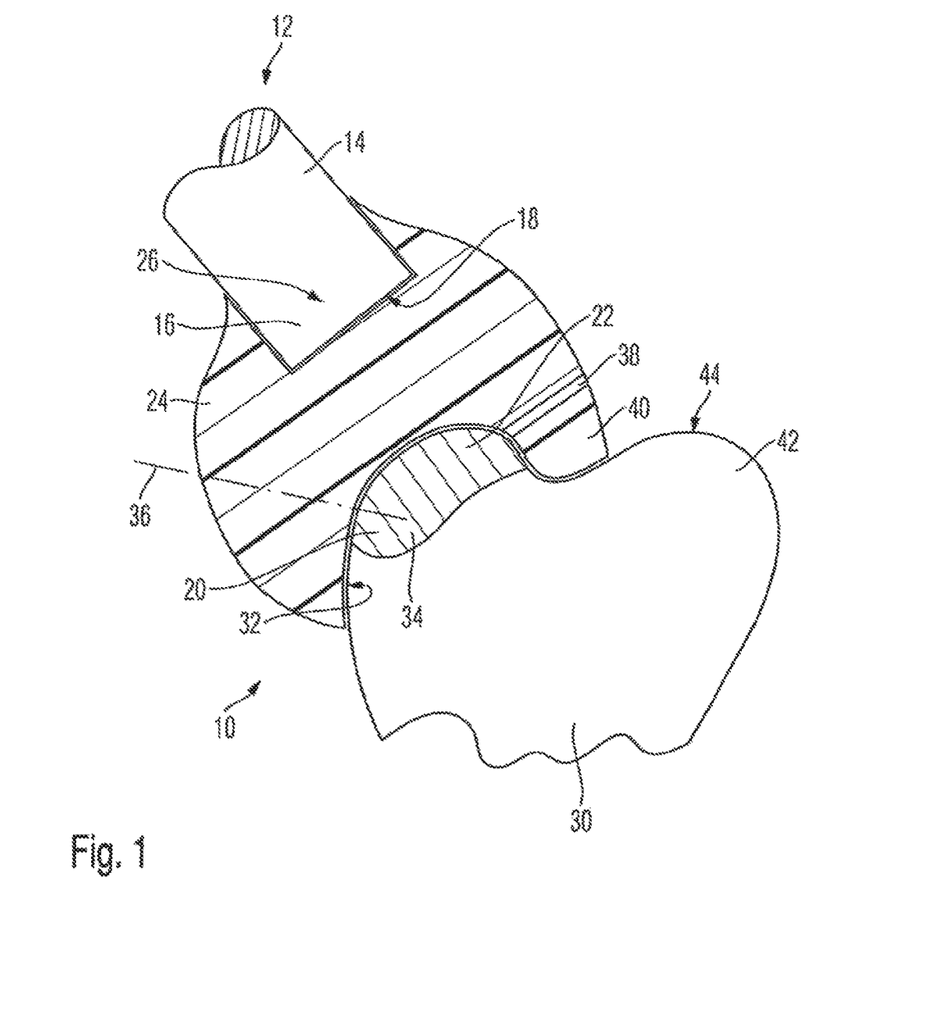
FIG. 1 shows a schematic view of an inventive dental restoration production device in one embodiment.

A dental material production device 10 as is illustrated in FIG. 1 comprises a radiation-curing device 12 of which the front part of a light-guide rod 14 is illustrated. The light-guide rod 14 comprises a front end 16 which ends in a light exit surface 18. The light-guide rod 14 comprises an emission spectrum which is adjusted to the photoinitiator(s) of the dental restoration material 20 which serves to produce a dental restoration part 22.

According to the invention, an add-on 24 is provided which is put on the end 16 of the light-guide rod 14.

In an alternative exemplary embodiment which is not illustrated herein an attachment is provided instead of an add-on 24 which extends only to the front away from the light exit surface 18 and with which the front end 16 of the light-guide rod 14 may be brought into contact.

According to the invention, it is crucial that the radiant power emitted by the radiation-curing device 12 as is provided at the light exit surface 18 is led into the add-on 24 completely or at least with a very high efficiency such as 99%. For this purpose, the add-on 24 comprises a seat opening 26 which is intended for the end 16. The seat opening 26 is substantially shaped like a blind hole and comprises a plane bottom whose shape is adjusted exactly to the shape of the light exit surface 18. Preferably, a suitable liquid is provided as a thin film which comprises the same refraction index as the add-on 24 and via which an air-free optical transition between the light exit surface 18 and the add-on 24 is produced.

The add-on 24 consists of silicone, preferably of highly transparent silicone and is shaped in a special manner.

Subsequent to the seat opening 26 the add-on 24 runs spherically or almost in the shape of a drop and extends away from the end 16 in this respect.

The add-on 24 is intended to be put against a tooth 30 such that the dental restoration material 20 present thereat which is still uncured and thus soft is surrounded completely. For this purpose, the add-on 24 seals the tooth 30 using a ring-shaped surface 32 which is created three-dimensionally and adjusted to the surface of the tooth. The width of the ring-shaped surface amounts to more than 1 mm and preferably to 2 mm to 3 mm in all places. This ensures that the support forces between the radiation-curing device 12 and the tooth 30 may be absorbed securely without deforming the add-on 24 notably.

The add-on 24 is slightly elastic as silicone is chosen as the material. The clamping effect of the add-on 24 at the end 16 benefits from this elasticity. For instance, the seat opening 26 may be produced to have a certain undersize compared to the diameter of the end 16 and is thus clamped thereon.

The add-on 24 is configured specially on its side facing the tooth 30 and thus distal side. Its shape is determined by a CAD device. For this purpose, a surface shape for the tooth to be restored is initially determined by CAD after an intra-oral scan of the mouth of the patient. Based thereon, the add-on 24 is produced as a negative mold with a molding surface facing the dental restoration surface. Thus, it also forms the upper end for a mold cavity 34 which is produced between the surface of the residual tooth 30 and the add-on 24. Its surface is created in correspondence with the desired shape of the target shape of the dental restoration part.

The dental restoration material 20 is inserted into the mold cavity 34 in any desired manner and in the soft that is uncured state. This may either take place as a type of drop which is applied to the residual tooth 30. Alternatively, one of the side flanks may also be penetrated with a syringe without further ado corresponding to the line 36 and the dental material 20 may be inserted into the already existing mold cavity via the syringe. On an opposite side, which is designated as 38 herein, an air outlet channel is provided which allows air to escape when the mold cavity 34 is filled. The air outlet channel 38 opens into the mold cavity 34 almost at its highest position such that no air bubbles are expected to remain thereat.

The air outlet channel 38 is filled preferably with a transparent but porous material which prevents dental restoration material 20 from entering and passing through.

For the provision of the dental restoration the radiation-curing device 12 is now initially equipped with the add-on 24 which fits the respective tooth to be restored. Now, the add-on 24 is pressed onto the tooth 30 in such a way that a secure tight fit and also a sealing are given. In the present exemplary embodiment, one side flank 40 of the add-on 24 is deliberately configured such that is reaches up to a counter-cusp 42 of the occlusal surface 44 of the tooth 30 and may rest thereon securely. Thus, the treating dentist also has a counter-support surface at the same time when handling the radiation-curing device 12 such that not only the translational but also the angular alignment of the add-on 24 are predefined with respect to the tooth 30 to be restored.

When the optimum restoration position of the add-on 24 is found the dentist inserts the dental restoration material 20 into the mold cavity 34 via a syringe known per se until a resistance is felt. The penetration resistance means that the mold cavity 34 is filled and that excess dental restoration material is blocked by the filtering function of the air outlet 38.

As soon as this is perceived, the syringe containing the liquid dental restoration material is removed. Due to the elasticity of the silicone, the inlet channel 36 for the dental restoration material is closed automatically.

The radiation-curing device is turned on for a predefined curing period which corresponds to the thickness of the dental restoration material 20 and ensures complete curing.

Radiation penetration takes place practically deflection-free and in particular with little reflection from the end 16 into the add-on 24 and then into the dental restoration material 20. Here, it is particularly favorable that the refraction indexes of the glass of the light-curing rod 14, of the add-on 24 and of the dental restoration material 20 differ from one another only by a small value. In the region of the negative mold or the molding surface, the dental restoration material 20 bears directly against the add-on 24 such that there, too, no air gap exists and accordingly practically no refraction of the radiation passing over.

Due to the favorable entrance angle of the radiation from the end 16 into the dental restoration material 20 the radiation is additionally reflected by the tooth-sided or gingival bottom of the mold cavity 34 and contributes to further complete curing.

Altogether, the realization of the radiation course optimized in this way results in a reduction of the exposure duration compared to the air-bound dental restoration production devices known per se by 20% to 40%.

Upon completion of the complete curing process the add-on 24 is removed together with the radiation-curing device 12 and the finished, already smoothed dental restoration part remains. Typically, the dental restoration part 22 comprises no ring-shaped bead which would require removal, provided that the desired support and sealing is effected at the ring-shaped surface 32.

Furthermore, polishing is not necessary due to the smoothing by the add-on 24, or only to a very small extent.

Figure 2:
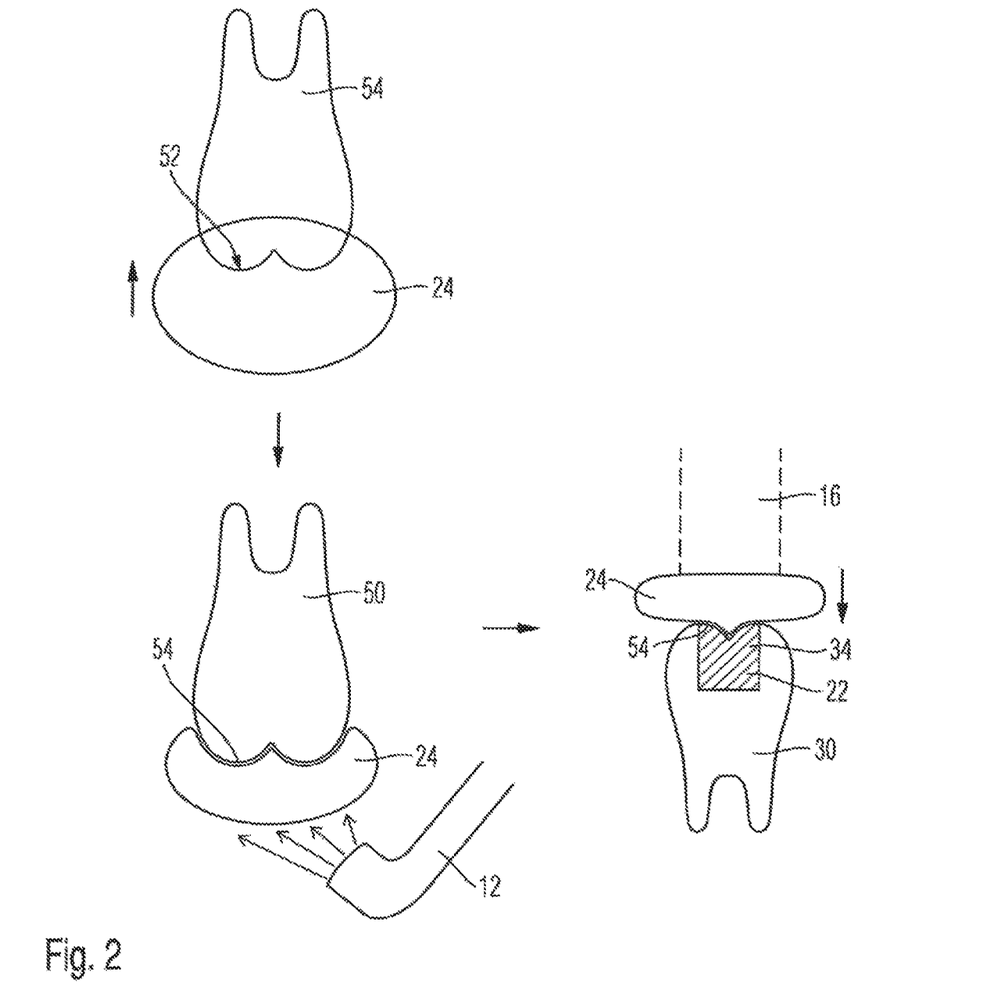
FIG. 2 shows a schematic illustration of a further embodiment of a dental material production device.

From FIG. 2 a further embodiment of an inventive dental restoration device is apparent. Here, the same reference signs indicate the same or corresponding parts as in the further Figure.

In the process to be explained with reference to FIG. 2 a soft that is uncured add-on 24 is provided initially. It is pressed to an antagonist 50 such that a negative mold 54 is produced at a surface 52. This impression of the add-on 24 on the antagonist 50 is now initially cured by the radiation-curing device 12. Then, the add-on 24 is removed from the antagonist 50 and turned over such that the negative mold 54 extends towards the tooth 30.

It is now used as an upper end of the mold cavity 34 filled with dental restoration material 20. The end 16 of the light-guide rod 14 of the radiation-curing device 12 is now pressed to the add-on 24, which is rather configured as an attachment here, namely above the negative mold 54. This is indicated by the dashed lines in FIG. 2. Then light curing takes place such that the tooth 30 which comprises the finished dental restoration part 22 obtains a shape matching the antagonist 50.

Figure 3:
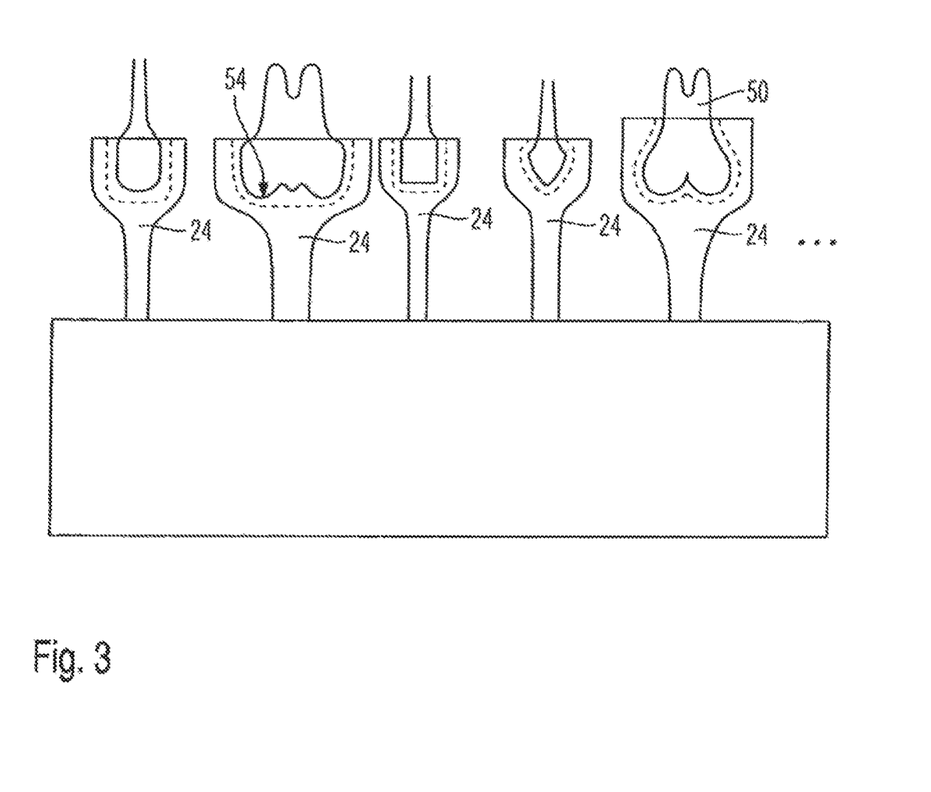
FIG. 3 shows a schematic illustration of a further embodiment of a dental material production device.

From FIG. 3 a further embodiment of the inventive process is apparent. Initially, impression are taken from numerous natural teeth 50 and corresponding negative molds 54 are provided. This is done for the seven or eight teeth of every quadrant of a natural set of teeth, and additionally in different sizes, such that nature-identical negative molds 54 are provided within the scope of a tooth mold library.

The corresponding nature-identical negative mold of the add-on 24 is then chosen and used for the provision of the mold cavity 34 at the respective tooth to be treated.

In this respect, this process may be considered the realization of a tooth mold key with molding surfaces.

Figure 4:
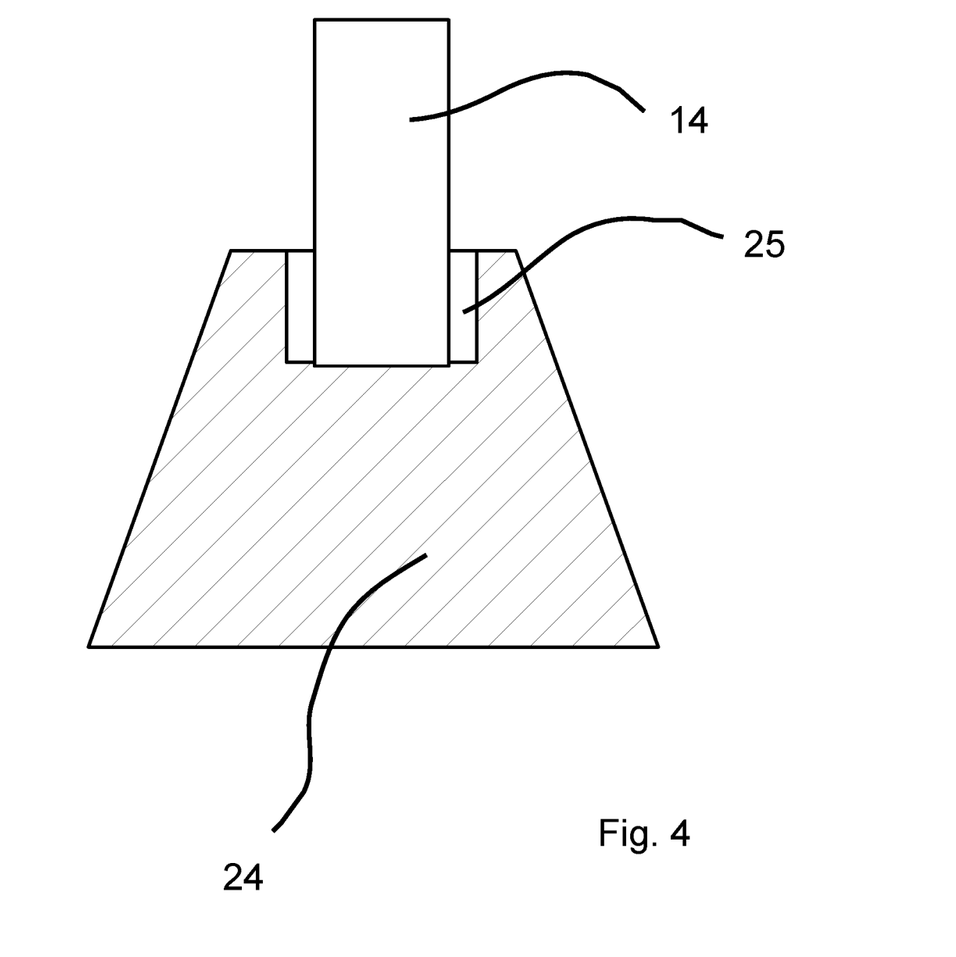
FIG. 4 shows a partial view of an embodiment of a dental material production device.

FIG. 4 shows add-on 24 with a detachable diameter adapter ring 25 by means of which a seat of the add-on 24 or attachment for the light guide with respect to a diameter of the light guide is adjustable by a reduction of the diameter by the adapter from a diameter of 10 mm to a diameter of 8 mm.

The invention claimed is:

1. A dental restoration production device, comprising
a curable dental restoration material (20),
a radiation-curing device by means of which the curable dental restoration material (20) can be cured using light radiation, UV radiation and/or heat radiation in order to produce a dental restoration part (22), and
an add-on (24) or attachment to the radiation-curing device, which faces said dental restoration material (20) or can be directed thereto,
wherein said attachment or add-on (24) has a molding surface that corresponds to a target shape of a surface (52) of the dental restoration material (20) and forms a negative mold (54) therefor on a region facing outward from the radiation-curing device,
wherein the add-on (24) or attachment comprises a through-opening which forms an inlet channel (36) for deformable and curable material,
wherein the inlet channel (36) is arranged to point into the add-on (24) or attachment outside of an optical axis of the light guide.

2. The dental restoration production device as claimed in claim 1,
wherein the add-on (24) or attachment is made of a transparent material and attached to a front face (18) of the radiation-curing device, and
wherein the add-on (24) or attachment includes a recess (26) for accommodating the radiation-curing device.

3. The dental restoration production device as claimed in claim 1,
wherein the add-on (24) or attachment is fabricated of a curable material which is pre-deformable before the curing process.

4. The dental restoration production device as claimed in claim 1,
wherein the add-on (24) or attachment is produced by milling or by rapid prototyping.

5. The dental restoration production device as claimed in claim 1,
wherein the add-on (24) or attachment comprises substantially the shape of a cone or a truncated cone on its side flanks (40).

6. The dental restoration production device as claimed in claim 1,
wherein the add-on (24) or attachment is mounted to the radiation-curing device in a non-positive or positive manner, and wherein the add-on (24) or attachment is configured to be used to apply pressure to the dental restoration material (20).

7. The dental restoration production device as claimed in claim 1,
   wherein the add-on (24) or attachment is produced by three-dimensional pressure and
   wherein a surface (52) of the add-on (24) or attachment facing a tooth surface (50) forms a negative mold (54) for the dental restoration material (20).

8. The dental restoration production device as claimed in claim 1,
   wherein the add-on (24) or attachment is attached detachably to a light guide of the radiation-curing device and configured as a disposable product.

9. The dental restoration production device as claimed in claim 1,
   wherein the add-on (24) or attachment comprises a basic shape which is connected firmly with the light guide of the radiation-curing device,
   wherein said basic shape is recreated by producing a negative mold of a shape of human teeth, and
   wherein the add-on (24) or attachment is fabricated of a transparent material.

10. The dental restoration production device as claimed in claim 1,
    wherein an impression material is provided and an impression is taken of an antagonist (50) of a tooth (30), and
    wherein the impression material is used to determine the shape of the add-on (24) or attachment after the impression material has cured.

11. The dental restoration production device as claimed in claim 1,
    wherein a plurality of add-ons or attachments is produced corresponding to natural human teeth as negative molds (54) and
    wherein one or more of the plurality of add-ons or attachments are pressed to the dental restoration material (20) and used to shape the dental restoration material (20).

12. The dental restoration production device as claimed in claim 1,
    wherein the add-on (24) or attachment comprises a seat for the front end (16) of a light guide, wherein said seat is attachable non-positively on the front end (16) of the light guide by means of a flange.

13. The dental restoration production device as claimed in claim 1,
    wherein the add-on (24) or attachment comprises a detachable diameter adapter ring by means of which a seat of the add-on (24) or attachment for the light guide with respect to a diameter of the light guide is adjustable by a reduction of the diameter by the adapter from a diameter of 10 mm to a diameter of 8 mm.

14. The dental restoration production device as claimed in claim 1,
    wherein the add-on (24) or attachment comprises an air outlet opposite of an inlet channel (36) arranged in the add-on (24) or attachment.

15. The dental restoration production device as claimed in claim 14,
    wherein the air outlet (38) comprises a porous element with fine pores configured to allow air to pass and be impenetrable by the curable material.

16. A process for the production of a dental restoration part from a dental restoration material (20), using a radiation-curing device (12), wherein the dental restoration material (20) is curable by means of light radiation, UV radiation and/or heat radiation, using an add-on (24) or attachment to the radiation-curing device, said add-on or attachment facing the dental restoration material in use,
    wherein a molding surface is configured on the attachment or add-on (24) in advance that is adapted to a surface shape to be produced of the dental restoration part to be produced and corresponds to a target shape of the surface of the dental restoration material, and
    wherein the molding surface forms a negative mold (54) for the dental restoration material (20) on a region facing outward from the radiation-curing device,
    wherein the add-on (24) or attachment comprises a through-opening which forms an inlet channel (36) for deformable and curable material,
    wherein the inlet channel (36) is arranged to point into the add-on (24) or attachment outside of an optical axis of the light guide, and
    wherein the radiation of the radiation-curing device is output to cure the dental restoration part, while the molding surface is held to the dental restoration material or pressed thereon.

* * * * *